(12) United States Patent
Xu et al.

(10) Patent No.: US 12,315,655 B2
(45) Date of Patent: May 27, 2025

(54) FLEXIBLE FLAT CABLE MANUFACTURING SYSTEM AND METHOD, AND FLEXIBLE FLAT CABLE

(71) Applicants: Tyco Electronics (Shanghai) Co. Ltd, Shanghai (CN); TE Connectivity Services GmbH, Schaffhausen (CH); Kunshan League Automechanism Co., Ltd, Kunshan (CN)

(72) Inventors: Zhonghua Xu, Shanghai (CN); Dandan (Emily) Zhang, Shanghai (CN); Roberto Francisco-Yi Lu, Bellevue, WA (US); Yuting He, Kunshan (CN); Haidong Wu, Kunshan (CN)

(73) Assignees: TE Connectivity Solutions GmbH, Schaffhausen (CH); Tyco Electronics (Shanghai) Co., Ltd., Shanghai (CN); Kunshan League Automechanism Co., Ltd., Kunshan (CN)

( * ) Notice: Subject to any disclaimer, the term of this patent is extended or adjusted under 35 U.S.C. 154(b) by 287 days.

(21) Appl. No.: 17/853,362

(22) Filed: Jun. 29, 2022

(65) Prior Publication Data
US 2023/0005645 A1    Jan. 5, 2023

(30) Foreign Application Priority Data
Jun. 30, 2021    (CN) .......................... 202110731647.1

(51) Int. Cl.
*B29C 65/50*    (2006.01)
*B32B 15/02*    (2006.01)
(Continued)

(52) U.S. Cl.
CPC ....... *H01B 13/103* (2013.01); *B29C 65/5092* (2013.01); *B32B 15/02* (2013.01);
(Continued)

(58) Field of Classification Search
CPC ................. B29C 65/50; B29C 65/5092; B29L 2031/3462; B32B 15/02; B32B 15/08;
(Continued)

(56) References Cited

U.S. PATENT DOCUMENTS

| | | | | |
|---|---|---|---|---|
| 5,408,050 A | * | 4/1995 | Kashio ................. | H05K 3/4092 29/829 |
| 5,525,188 A | * | 6/1996 | Ingwersen ............. | H01R 43/00 29/745 |

(Continued)

*Primary Examiner* — Michael A Tolin
(74) *Attorney, Agent, or Firm* — Barley Snyder

(57) ABSTRACT

A flexible flat cable manufacturing system comprises a tape conveying device conveying an adhesive tape along a first direction, and a wire conveying device conveying a row of wires along a second direction perpendicular to the first direction and parallel to a width direction of the conveyed adhesive tape. A wire pressing device presses and pastes the part of the row of wires facing the adhesive tape onto the adhesive tape. A wire cutting device cuts the row of wires to obtain a row of wire segments pasted on the adhesive tape and separated from the row of wires and produces a flexible flat cable including the adhesive tape and the wire segments pasted on the adhesive tape.

15 Claims, 8 Drawing Sheets

(51) Int. Cl.
*B32B 37/06* (2006.01)
*B32B 38/00* (2006.01)
*H01B 7/08* (2006.01)
*H01B 13/00* (2006.01)
*H01B 13/10* (2006.01)
*B29L 31/34* (2006.01)

(52) U.S. Cl.
CPC .......... *B32B 37/06* (2013.01); *B32B 38/0004* (2013.01); *H01B 13/0016* (2013.01); *B29L 2031/3462* (2013.01); *H01B 7/0846* (2013.01)

(58) Field of Classification Search
CPC ... B32B 37/06; B32B 38/0004; H01B 7/0009; H01B 7/0018; H01B 7/04; H01B 7/08; H01B 7/0823; H01B 7/0838; H01B 7/0846; H01B 13/0003; H01B 13/0006; H01B 13/0009; H01B 13/0013; H01B 13/0016; H01B 13/0036; H01B 13/012; H01B 13/01209; H01B 13/01236; H01B 13/01254; H01B 13/10; H01B 13/103; H01B 13/106
See application file for complete search history.

(56) References Cited

U.S. PATENT DOCUMENTS

| | | | | |
|---|---|---|---|---|
| 5,878,489 A | * | 3/1999 | Shioda | H01B 7/0838 29/33 F |
| 10,460,855 B2 | * | 10/2019 | Yan | H01R 12/728 |
| 2009/0133898 A1 | * | 5/2009 | Kojima | H01B 13/01254 156/50 |

* cited by examiner

FLEXIBLE FLAT CABLE MANUFACTURING SYSTEM AND METHOD, AND FLEXIBLE FLAT CABLE

CROSS-REFERENCE TO RELATED APPLICATIONS

This application claims the benefit of Chinese Patent Application No. CN202110731647.1 filed on Jun. 30, 2021, in the State Intellectual Property Office of China, the whole disclosure of which is incorporated herein by reference.

FIELD OF THE INVENTION

The present disclosure relates to electrical a flexible flat cable, a manufacturing system for manufacturing the flexible flat cable and a manufacturing method for manufacturing the flexible flat cable.

BACKGROUND

As understood by those skilled in the art, flexible flat cables (FFCs) or flexible flat circuits are electrical components consisting of at least one conductor embedded within a thin, flexible strip of insulation. Flexible flat cables are gaining popularity across many industries due to advantages offered over their traditional wire counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

Improved flexible flat cables, as well as systems and methods for manufacturing the same are desired.

SUMMARY

According to an embodiment of the present disclosure, a flexible flat cable manufacturing system comprises a tape conveying device conveying an adhesive tape along a first direction, and a wire conveying device conveying a row of wires along a second direction perpendicular to the first direction and parallel to a width direction of the conveyed adhesive tape. A wire pressing device presses and pastes the part of the row of wires facing the adhesive tape onto the adhesive tape. A wire cutting device cuts the row of wires to obtain a row of wire segments pasted on the adhesive tape and separated from the row of wires and produces a flexible flat cable including the adhesive tape and the wire segments pasted on the adhesive tape.

BRIEF DESCRIPTION OF THE DRAWINGS

The invention will now be described by way of example with reference to the accompanying Figures, of which.

DETAILED DESCRIPTION OF THE EMBODIMENTS

Figure 1:
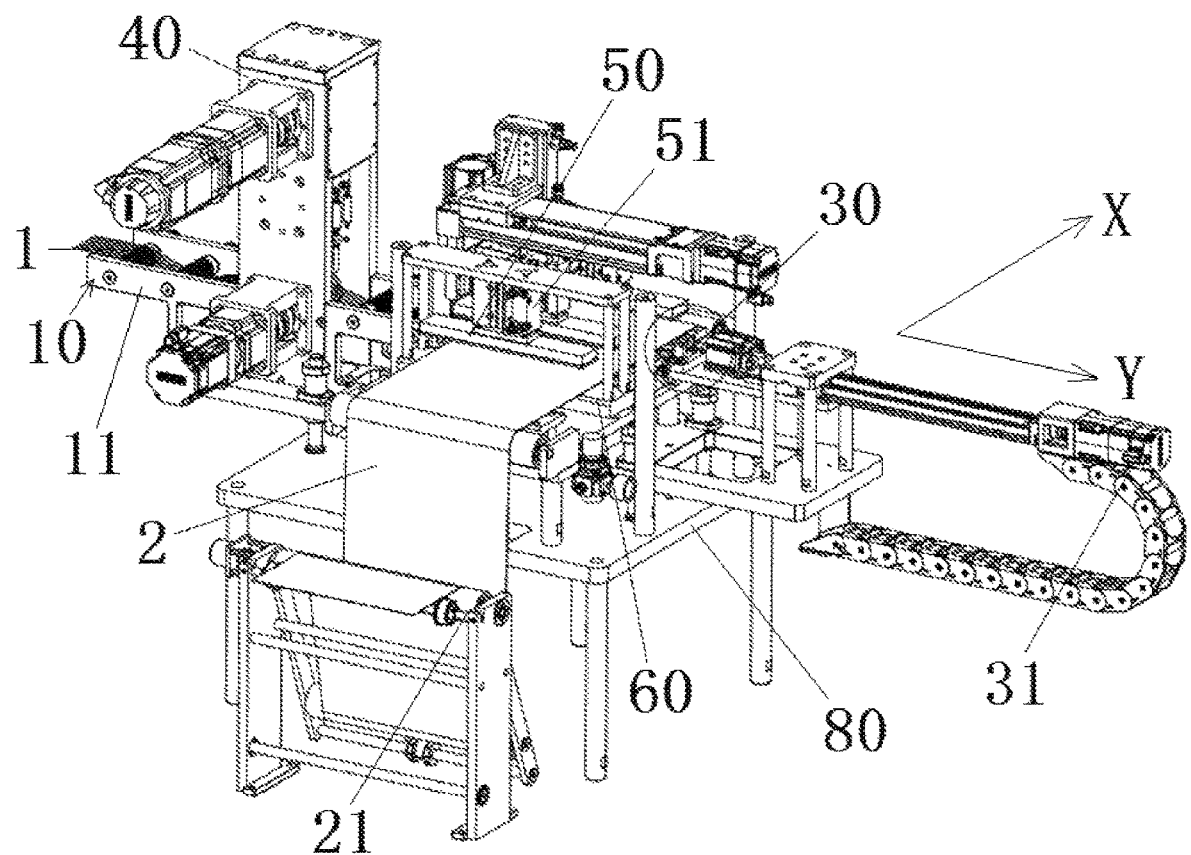
FIG. 1 shows a three-dimensional schematic diagram of a flexible flat cable manufacturing system according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a flexible flat cable manufacturing system comprises a tape conveying device for conveying an adhesive tape along a first direction. A wire conveying device of the system conveys a row of wires along a second direction perpendicular to the first direction and parallel to a width direction of the conveyed adhesive tape. A wire pressing device is provided for pressing and pasting the part of the row of wires facing the adhesive tape onto the adhesive tape. A wire cutting device cuts the row of wires to obtain a row of wire segments pasted on the adhesive tape and separated from the row of wires, so as to produce a flexible flat cable including the adhesive tape and the wire segments pasted on the adhesive tape.

According to another embodiment of the present disclosure, a method for manufacturing a flexible flat cable comprises steps of: 1) providing the above flexible flat cable manufacturing system; 2) conveying an adhesive tape along the first direction and conveying a row of wires along the second direction; 3) pressing and pasting the part of the row of wires facing the adhesive tape onto the adhesive tape; and 4) cutting the row of wires to obtain a row of wire segments pasted on the adhesive tape and separated from the row of wires, so as to produce a flexible flat cable comprising the adhesive tape and the wire segments pasted on the adhesive tape.

According to another embodiment of the present disclosure, a flexible flat cable manufactured by the above flexible flat cable manufacturing system or by the above flexible flat cable manufacturing method is provided. The wire segments serve as conductors of the flexible flat cable, and the adhesive tape is served as an insulating film of the flexible flat cable. The wire segments are spaced from each other in the length direction of the flexible flat cable, and each wire segment extends along the width direction of the flexible flat cable.

FIG. 1 shows a three-dimensional schematic diagram of a flexible flat cable manufacturing system according to an exemplary embodiment of the present disclosure. As shown, the flexible flat cable manufacturing system mainly includes a tape conveying device, a wire conveying device 10, 30, a wire pressing device 50, 51, and a wire cutting device 70, 71. The tape conveying device is used to transport the adhesive tape 2 in the first direction X. The wire conveying device 10, 30 is used to convey a row of wires 1 along the second direction Y perpendicular to the first direction X and parallel to the width direction of the conveyed tape 2. The flexible flat cable manufacturing system also includes a frame 80. The tape conveying device, the wire conveying device, the wire pressing device and the wire cutting device can be installed on the frame 80.

Figure 4:
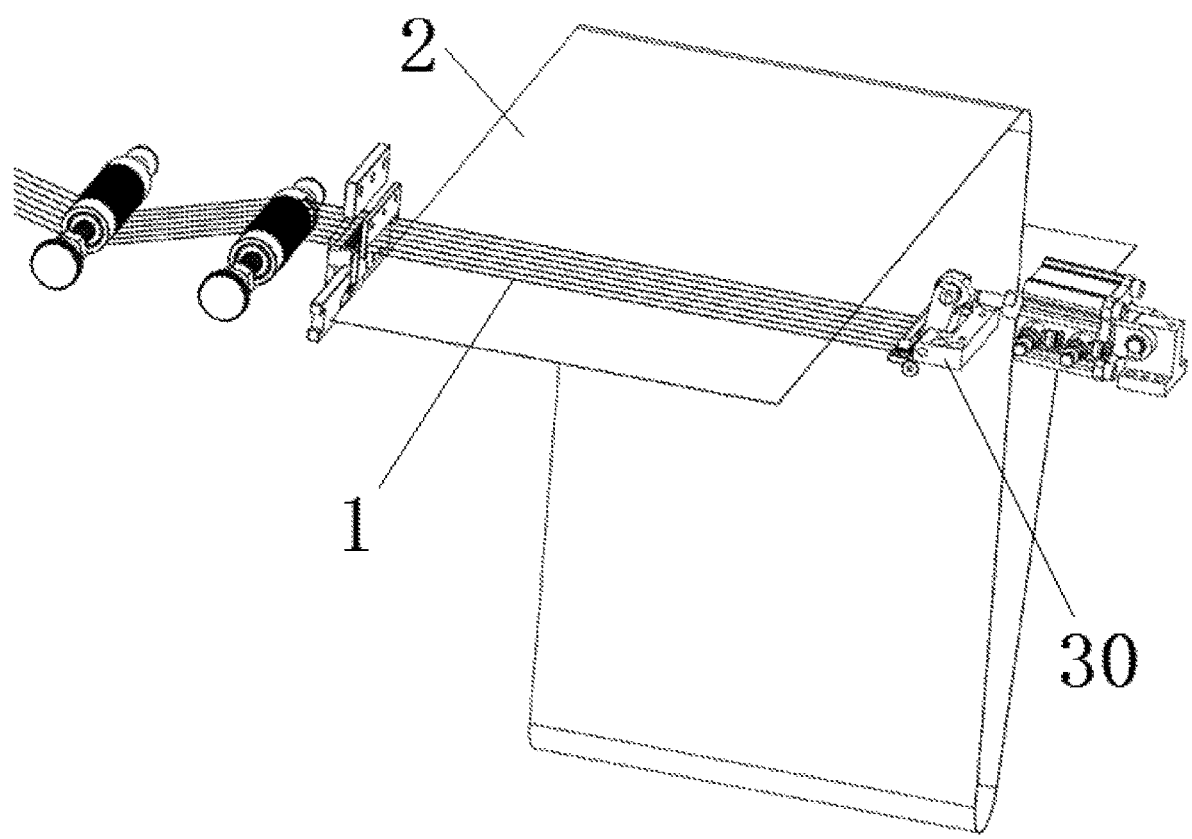
FIG. 4 shows a partial schematic diagram of the flexible flat cable manufacturing system shown in FIG. 1, in which the wire clamp drags the end of the clamped row of wires from one side of the width direction of the adhesive tape to the other side, so that the row of wires crosses the adhesive tape.
Figure 5:
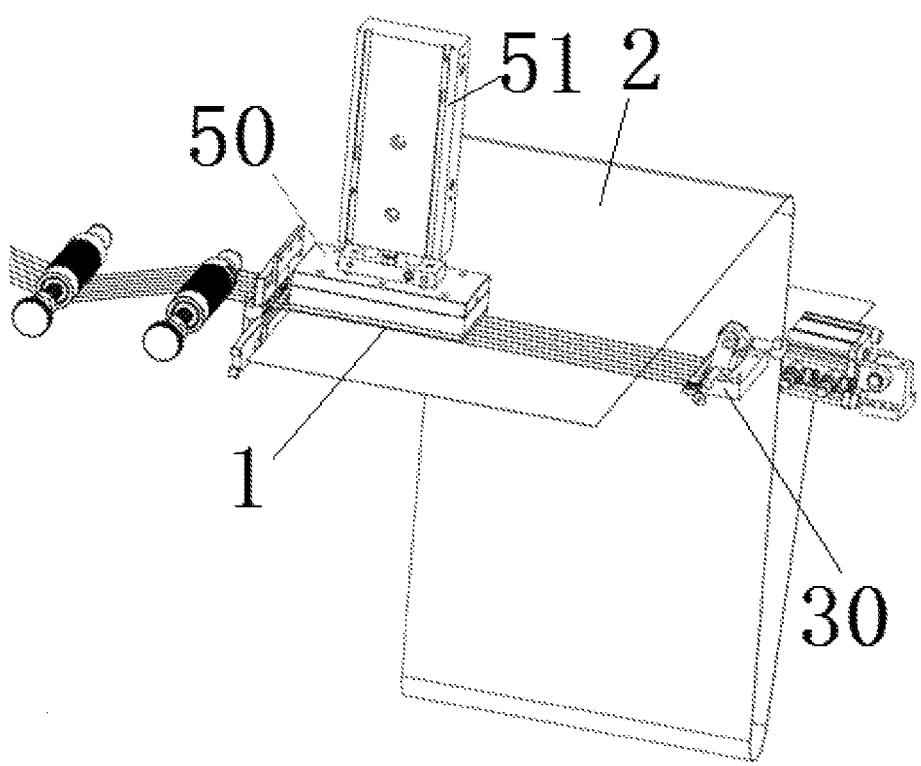
FIG. 5 shows a schematic diagram of pressing and pasting the row of wires across the adhesive tape shown in FIG. 4 onto the adhesive tape with a wire pressing device.

FIG. 4 shows a partial schematic diagram of the flexible flat cable manufacturing system shown in FIG. 1, in which the wire clamp 30 drags the end of the clamped row of wires 1 from one side of the width direction of the adhesive tape 2 to the other side, so that the row of wires 1 crosses the adhesive tape 2. FIG. 5 shows a schematic diagram of pressing and pasting the row of wires 1 across the adhesive tape 2 shown in FIG. 4 onto the adhesive tape 2 with wire pressing device 50, 51. As shown in FIG. 1 and FIGS. 4-5, the wire pressing device 50, 51 is used to press and paste the part of the row of wires 1 facing the adhesive tape 2 onto the adhesive tape 2.

Figure 6:
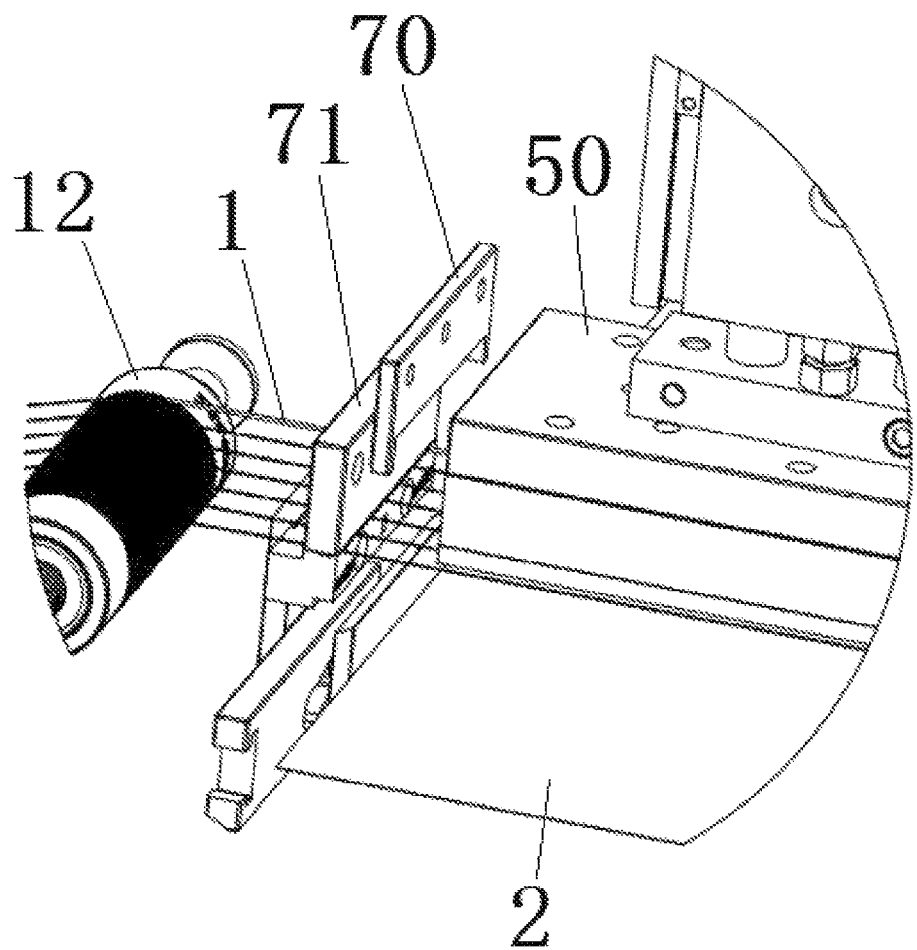
FIG. 6 shows a schematic diagram of cutting the row of wires with a wire cutting device after the row of wires are pressed and pasted on the adhesive tape.
Figure 7:
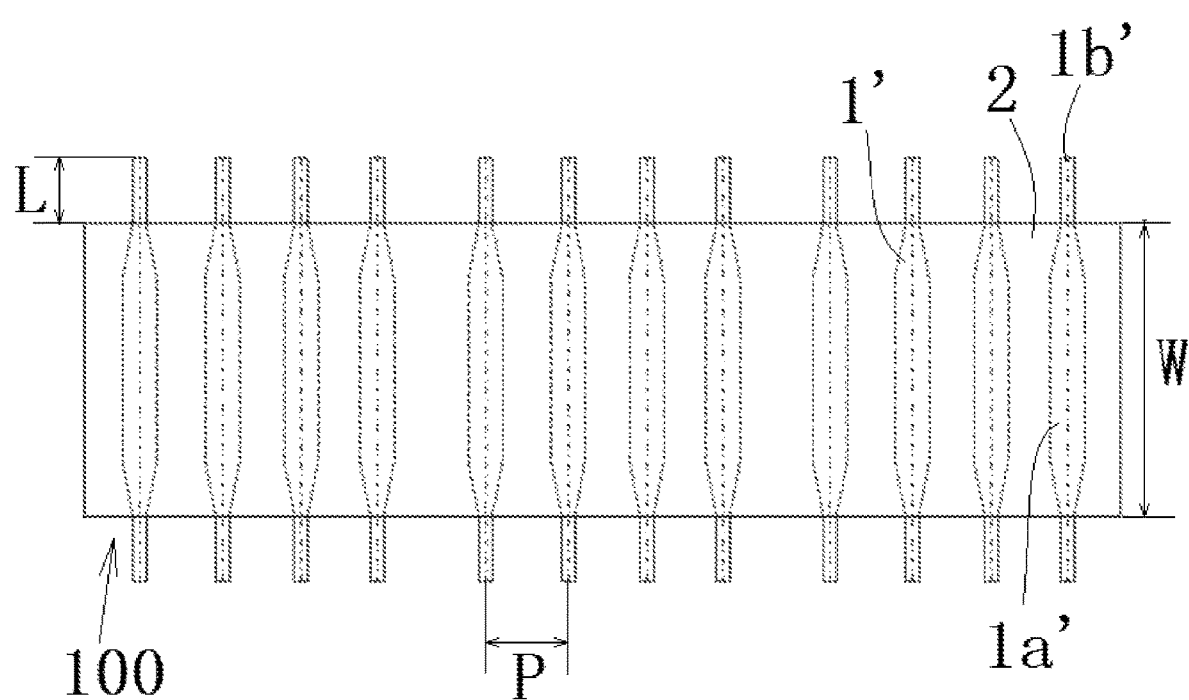
FIG. 7 shows a schematic diagram of a manufactured flexible flat cable according to an exemplary embodiment of the present disclosure.

FIG. 6 shows a schematic diagram of cutting the row of wires 1 with wire cutting device 70, 71 after the row of wires 1 is pressed and pasted on the adhesive tape 2. FIG. 7 shows a schematic diagram of a manufactured flexible flat cable 100 according to an exemplary embodiment of the present disclosure. As shown, the wire cutting device 70, 71 is used to cut the row of wires 1 to obtain a row of wire segments 1' pasted on the adhesive tape 2 and separated from the row of wires 1, so as to produce a flexible flat cable 100 including the adhesive tape 2 and the wire segments 1' pasted on the adhesive tape 2.

As shown in FIGS. 1 and 4-7, the flexible flat cable manufacturing system also includes a stamping device 40 for stamping the row of wires 1 to form the part of the row of wires 1 corresponding to the row of wire segments 1' into a predetermined shape. In the embodiment shown in FIG. 7, the wire segment 1' includes a middle portion 1a' covered by the adhesive tape 2 and two ends 1b' exposed from both sides in the width direction of the adhesive tape 2. The middle part 1a' of the wire segment 1' is flattened by the stamping device 40 so that the thickness of the middle part 1a' of the wire segment 1' is less than the thickness/diameter of the end 1b' of the wire segment 1'. In the conveying direction of the row of wires 1, the stamping device 40 is located upstream of the wire pressing device 50, 51 so that the part of the row of wires 1 corresponding to the row of wire segments 1' is preformed into the predetermined (e.g., non-linear) shape before pasting the row of wires 1.

As shown in FIG. 1, the flexible flat cable manufacturing system also includes a heating device 60 for heating the adhesive tape 2 to improve the viscosity of the adhesive tape 2. The wire pressing device 50, 51 includes a pressing plate 50 located above the adhesive tape 2 and a driving mechanism 51 driving the pressing plate 50 to move in a direction perpendicular to the surface of the adhesive tape 2. The heating device 60 includes a heating plate located below the adhesive tape 2 and opposite to the pressing plate 50. In the illustrated embodiment, the row of wires 1 and the adhesive tape 2 are adapted to be pressed between the pressing plate 50 of wire pressing device 50, 51 and the heating plate of heating device 60 to paste the part of the row of wires 1 facing the adhesive tape 2 onto the adhesive tape 2.

Figure 2:
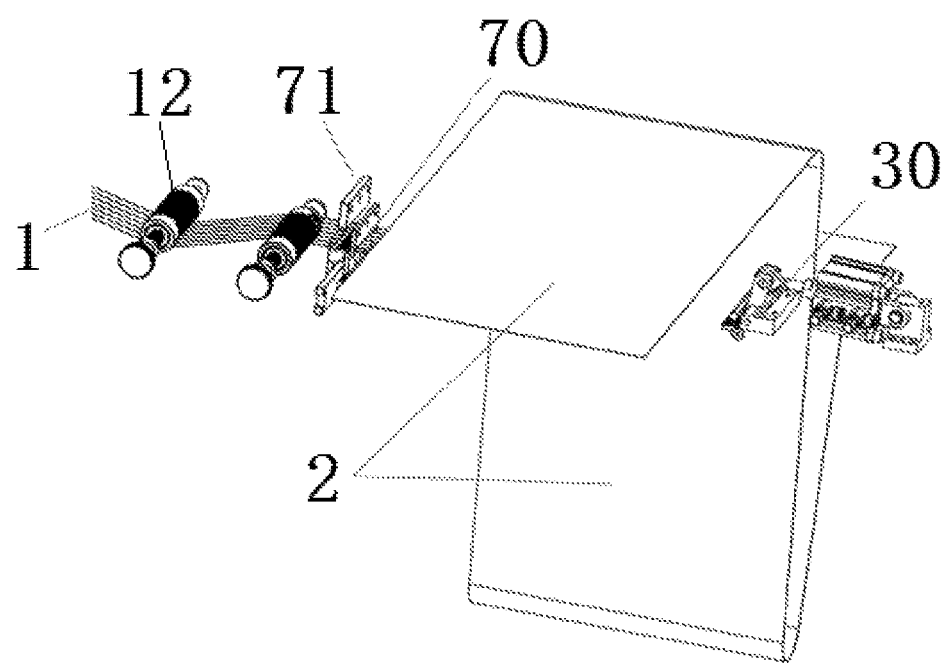
FIG. 2 shows a partial schematic diagram of the flexible flat cable manufacturing system shown in FIG. 1, in which the wire clamp is in the initial position on one side of the width direction of the adhesive tape.
Figure 3:
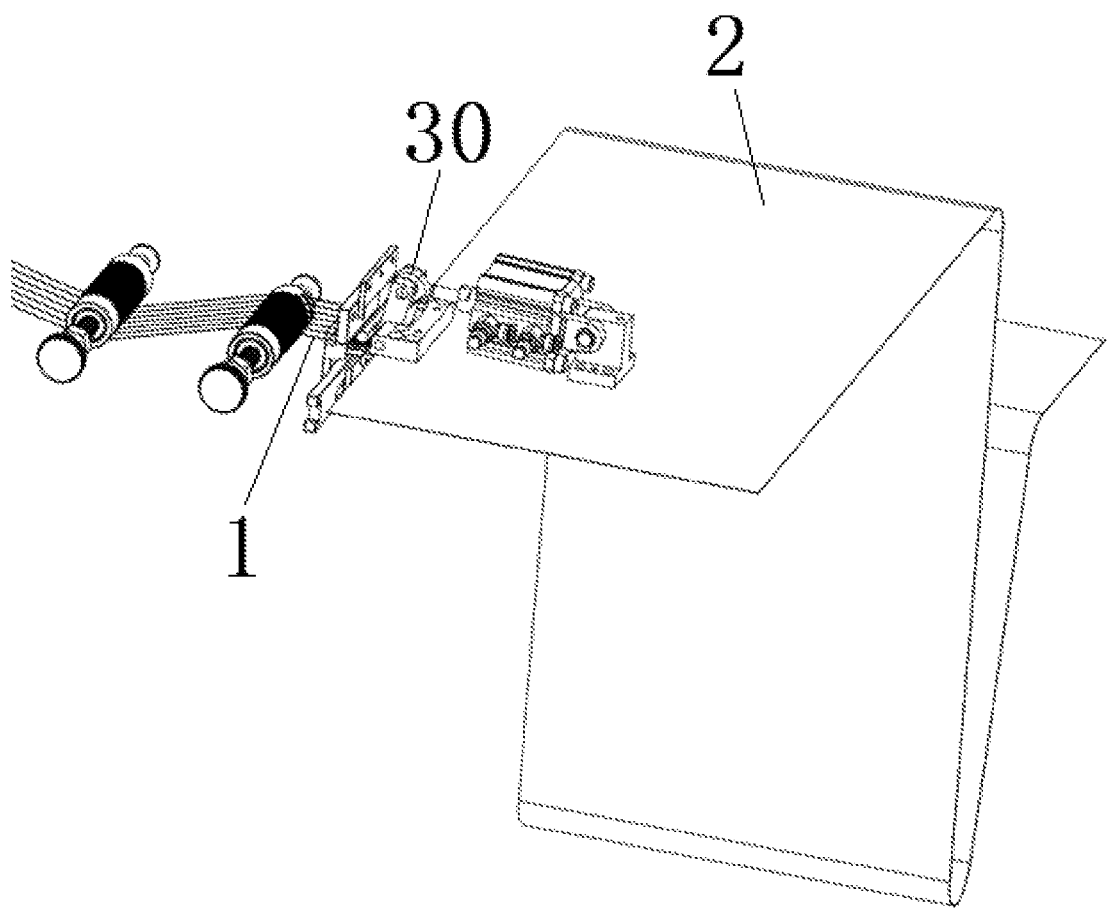
FIG. 3 shows a partial schematic diagram of the flexible flat cable manufacturing system shown in FIG. 1, in which the wire clamp is moved to the other side of the width direction of the adhesive tape and clamps the end of a row of wires.

FIG. 2 shows a partial schematic diagram of the flexible flat cable manufacturing system shown in FIG. 1, in which the wire clamp 30 is in the initial position on one side of the width direction of the adhesive tape 2. FIG. 3 shows a partial schematic diagram of the flexible flat cable manufacturing system shown in FIG. 1, in which the wire clamp 30 is moved to the other side in the width direction of the adhesive tape 2 and clamps the ends of the row of wires 1.

As shown in FIGS. 1-7, the wire conveying device 10 and 30 includes a wire supply device 10 and a wire clamp 30. The wire supply device 10 is used to supply a row of wires 1. The wire clamp 30 is used to clamp the ends of the supplied row of wires 1 and drag the clamped row of wires 1 forward to a predetermined position along the second direction Y. The wire supply device 10 includes a conveying channel 11 and a plurality of guide rollers 12. The row of wires 1 is conveyed through the conveying channel 11. The plurality of guide rollers 12 are rotatably installed at a plurality of different positions in the conveying channel 11 to guide the row of wires 1 to move forward along the second direction Y.

In an exemplary embodiment of the present disclosure, a row of positioning slots (not shown) can be formed on the guide roller 12, and the row of wires 1 are respectively positioned in the row of positioning slots to ensure that the spacing between adjacent wires 1 in the row of wires 1 is equal to the predetermined spacing and remains unchanged during transportation. In the conveying direction of the row of wires 1, the wire cutting device 70, 71 is located at the downstream outlet of the wire supply device 10. The wire cutting device 70, 71 includes a cutter 70 and a fixing clamp 71. The cutter 70 is adapted to be opened and closed to cut the row of wires 1. The fixing clamp 71 is arranged on the upstream side of the cutter 70 to clamp the row of wires 1 when the row of wires 1 is cut by the cutter 70.

After the wire clamp 30 clamps the ends of the row of wires 1, the fixing clamp 71 releases the row of wires 1 to allow the wire clamp 30 to drag the row of wires 1 forward to the predetermined position in the second direction Y. Note that in the illustrated embodiment, the position of the fixing clamp 71 is fixed, and the wire clamp 30 is a movable fixture. In the present application, when the wire clamp 30 does not clamp and drag the row of wires 1, the fixing clamp 71 can clamp the row of wires 1 to ensure that the row of wires 1 will not move and loosen. The flexible flat cable manufacturing system also includes a driving device 31 for driving the wire clamp 30 to move in the second direction Y.

In the exemplary embodiment, the tape conveying device includes a supply drum 21, a recovery drum (not shown, e.g., a drum of the same configuration as the supply drum) and a drum driving device (not shown, e.g., rotatory actuator or motor). The supply drum 21 is wound with the adhesive tape 2 to supply the adhesive tape 2. The recovery drum is used to recover the adhesive tape 2 pasted with the wire segment 1' (i.e., to recover the produced flexible flat cable 100). The drum driving device is used to drive the recovery drum to rotate, so as to coil the produced flexible flat cable 100 on the recovery drum and drag the adhesive tape 2 forward along the first direction X. As the structure of the recovery drum may be the same as the supply drum 21, and because driving devices suitable for driving one or more of the supply drum 21 or the recovery drum are known, further illustration of these elements is not required for an understanding of the present disclosure.

Figure 8:
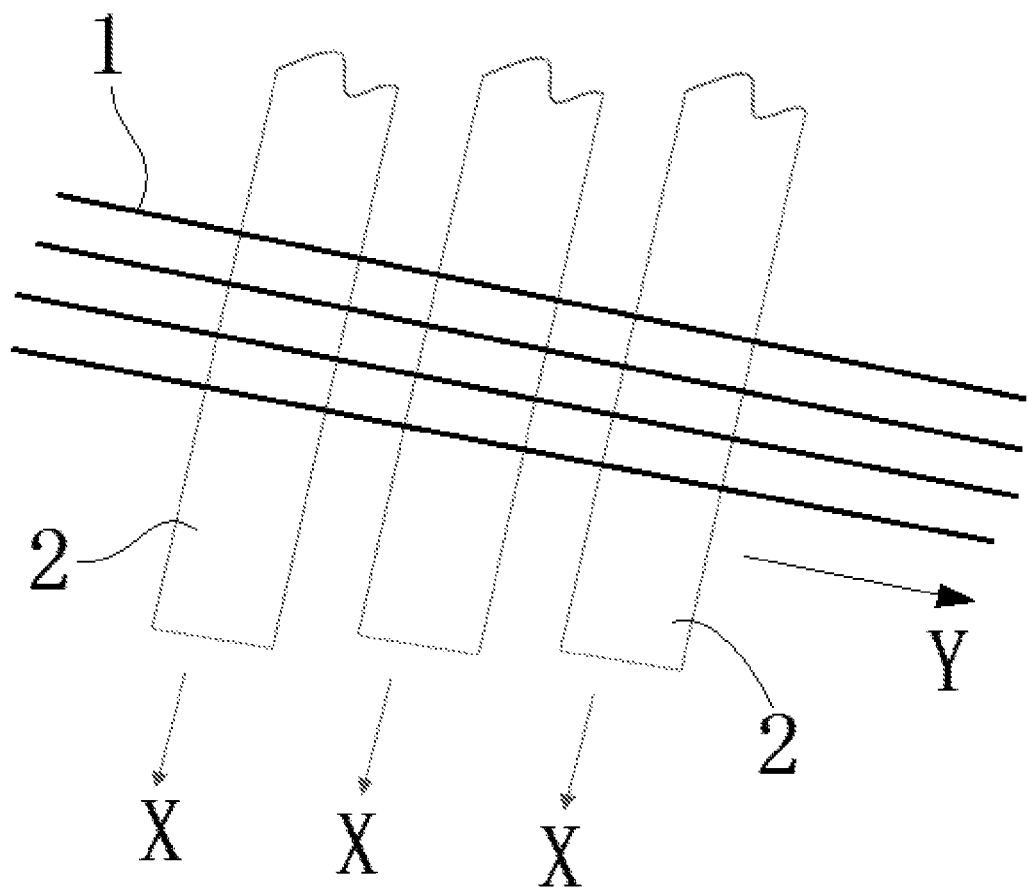
FIG. 8 shows a schematic diagram of a flexible flat cable manufacturing system according to another exemplary embodiment of the present disclosure.

FIG. 8 shows a schematic diagram of a flexible flat cable manufacturing system according to another exemplary embodiment of the present disclosure. The flexible flat cable manufacturing system shown in FIG. 8 is distinct from that shown in FIG. 1 in that the number of the supplied adhesive tapes 2 is different. As shown in FIG. 8, the tape conveying device is suitable for conveying a plurality of adhesive tapes 2 arranged side by side at the same time. The wire pressing device 50, 51 (see FIGS. 1-7) is suitable for pressing and pasting the row of wires 1 onto the plurality of adhesive tapes 2 at the same time. The wire cutting device 70, 71 (see FIGS. 1-7) is suitable for cutting the row of wires 1 to obtain a plurality of rows of wire segments 1' pasted on the plurality of adhesive tapes 2 respectively, so that a plurality of flexible flat cables 100 can be manufactured at the same time. In this way, the manufacturing efficiency of the flexible flat cable 100 is improved according to the embodiments of the present disclosure.

A manufacturing process of manufacturing flexible flat cable 100 will be described below with reference to FIGS. 1-7. The manufacturing process includes the steps of:

S100: providing a flexible flat cable manufacturing system as shown in FIG. 1;

S200: conveying the adhesive tape 2 along the first direction X, as shown in FIGS. 1 and 2;

S300: moving the wire clamp 30 from the initial position at one side in the width direction of the adhesive tape 2 to the other side and clamping the ends of the row of wires 1 by the wire clamp 30, as shown in FIG. 2 and FIG. 3;

S400: the wire clamp 30 drags the clamped row of wires 1 back to the initial position of the wire clamp 30, so that the row of wires 1 crosses the adhesive tape 2, as shown in FIG. 3 and FIG. 4;

S500: pressing and pasting the part of the row of wires 1 facing the adhesive tape 2 onto the adhesive tape 2 with wire pressing device 50, 51, as shown in FIG. 5;

S600: cutting the row of wires 1 with the wire cutting device 70, 71 to obtain a row of wire segments 1' pasted on the adhesive tape 2 and separated from the row of wires 1, as shown in FIG. 6 and FIG. 7;

S700: repeat the above steps S200 to S600 to manufacture the flexible flat cable 100 shown in FIG. 7.

As shown in FIG. 7, the flexible flat cable 100 includes an adhesive tape 2 and the wire segments 1' pasted on the adhesive tape 2. The wire segments 1' are served as the conductor of the flexible flat cable 100. The adhesive tape 2 covers the wire segments 1' and is served as an insulating film of the flexible flat cable 100. The wire segments 1' are arranged along the length direction of the flexible flat cable 100 and spaced from each other. Each wire segment 1' on the flexible flat cable 100 extends along the width direction of the flexible flat cable 100.

The wire segment 1' includes a middle part 1a' covered by the adhesive tape 2 and two end parts 1b' exposed from both sides of the width direction of the adhesive tape 2. The middle part 1a' of the wire segment 1' is flattened so that the thickness of the middle part 1a' of the wire segment 1' is less than the thickness/diameter of the end 1b' of the wire segment 1'. In the illustrated embodiment, a pitch between adjacent wire segments 1' on the flexible flat cable 100 is equal to a predetermined spacing P, the end 1b' of the wire segment 1' exposed from the adhesive tape 2 has a predetermined length L, and the adhesive tape 2 has a predetermined width W. The predetermined spacing P, the predetermined length L and the predetermined width W may be adjusted according to actual needs.

In addition, those areas in which it is believed that those of ordinary skill in the art are familiar, have not been described herein in order not to unnecessarily obscure the disclosure described. Accordingly, it has to be understood that the disclosure is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A flexible flat cable manufacturing system, comprising:
a tape conveying device conveying an adhesive tape along a first direction;
a wire conveying device conveying a row of wires along a second direction perpendicular to the first direction and parallel to a width direction of the conveyed adhesive tape;
a wire pressing device pressing and pasting a part of the row of wires facing the adhesive tape onto the adhesive tape; and
a wire cutting device cutting the row of wires to obtain a row of wire segments pasted on the adhesive tape and separated from the row of wires and producing a flexible flat cable including the adhesive tape and the wire segments pasted on the adhesive tape.

2. The flexible flat cable manufacturing system according to claim 1, further comprising a stamping device for stamping the row of wires such that a part of the row of wires corresponding to the row of wire segments is formed into a predetermined non-linear shape.

3. The flexible flat cable manufacturing system according to claim 2, wherein each wire segment includes a middle part covered by the adhesive tape and two ends exposed from both sides in the width direction of the adhesive tape, the middle part of each wire segment is flattened by the stamping device such that a thickness of the middle part of each wire segment is less than a thickness or a diameter of the ends of each wire segment.

4. The flexible flat cable manufacturing system according to claim 2, wherein in a conveying direction of the row of wires, the stamping device is located upstream of the wire pressing device such that the part of the row of wires corresponding to the row of wire segments is formed into the predetermined shape before pasting the row of wires onto the adhesive tape.

5. The flexible flat cable manufacturing system according to claim 1, further comprising a heating device heating the adhesive tape and altering its viscosity.

6. The flexible flat cable manufacturing system according to claim 5, wherein:
   the wire pressing device comprises:
      a pressing plate located above the adhesive tape; and
      a driving mechanism driving the pressing plate to move in a direction perpendicular to a surface of the adhesive tape; and
   the heating device comprises a heating plate located below the adhesive tape and opposite to the pressing plate, when the row of wires and the adhesive tape are pressed between the pressing plate of the wire pressing device and the heating plate of the heating device, the part of the row of wires facing the adhesive tape is pasted onto the adhesive tape.

7. The flexible flat cable manufacturing system according to claim 1, wherein the wire conveying device comprises:
   a wire supply device supplying the row of wires; and
   a wire clamp clamping an end of the supplied row of wires and dragging the clamped row of wires to move forward to a predetermined position along the second direction.

8. The flexible flat cable manufacturing system according to claim 7, wherein the wire supply device comprises:
   a conveying channel through which the row of wires are conveyed; and
   a plurality of guide rollers respectively rotatably installed at a plurality of different positions in the conveying channel and guiding the row of wires to move forward.

9. The flexible flat cable manufacturing system according to claim 8, wherein a row of positioning slots are formed on one of the guide rollers, and the row of wires are respectively positioned in the row of positioning slots to ensure that a spacing between adjacent wires in the row of wires is equal to a predetermined spacing and remains unchanged during conveying of the row of wires.

10. The flexible flat cable manufacturing system according to claim 7, wherein in a conveying direction of the row of wires, the wire cutting device is located at a downstream outlet of the wire supply device, the wire cutting device comprising:
    a cutter adapted to be opened and closed to cut the row of wires; and
    a fixing clamp provided at an upstream side of the cutter and clamping the row of wires when the row of wires is cut by the cutter.

11. The flexible flat cable manufacturing system according to claim 10, wherein after the wire clamp clamps the ends of the row of wires, the fixing clamp releases the row of wires to allow the row of wires to be dragged by the wire clamp and moved forward to the predetermined position in the second direction.

12. The flexible flat cable manufacturing system according to claim 11, further comprising a driving device for driving the wire clamp to move in the second direction.

13. The flat cable conveying system according to claim 1, wherein the tape conveying device comprises a supply drum on which the adhesive tape is wound.

14. The flat cable conveying system according to claim 13, wherein the tape conveying device further comprises:
    a recovery drum for recovering the produced flexible flat cable which comprises the adhesive tape and the wire segments pasted on the adhesive tape; and
    a drum driving device for driving the recovery drum to rotate such that the produced flexible flat cable is wound on the recovery drum and the adhesive tape is dragged by the recovery drum to move forward along the first direction.

15. The flexible flat cable manufacturing system according to claim 1, wherein:
    the tape conveying device conveys a plurality of adhesive tapes arranged side by side at the same time;
    the wire pressing device presses and pastes the row of wires onto the plurality of adhesive tapes at the same time; and
    the wire cutting device cuts the row of wires to obtain a plurality of rows of wire segments respectively pasted on the plurality of adhesive tapes, so as to produce a plurality of flexible flat cables at the same time.

* * * * *